United States Patent [19]
Lacombe et al.

[11] Patent Number: 5,547,628
[45] Date of Patent: Aug. 20, 1996

[54] METHOD OF MANUFACTURING THERMAL SHIELDING ELEMENTS FOR SPACE PLANES

[75] Inventors: Alain Lacombe, Pessac; Jean-Michel Rouges, Merignac, both of France

[73] Assignee: Societe Europeenne de Propulsion, Suresnes, France

[21] Appl. No.: 207,388

[22] Filed: Mar. 8, 1994

[30] Foreign Application Priority Data

Mar. 9, 1993 [FR] France .................................. 93 02703

[51] Int. Cl.⁶ .............................. B27N 3/10; B32B 31/06
[52] U.S. Cl. .................... 264/257; 264/62; 264/81; 264/259; 264/261; 264/263; 427/228; 427/248.1; 427/299
[58] Field of Search .................. 264/29.1, 29.6, 264/257, 258, 259, 263, 81, 261, 60, 62; 156/90, 212; 427/228, 248.1, 249, 255, 299, 314

[56] References Cited

U.S. PATENT DOCUMENTS 4,456,208  6/1984  MacConochie et al. ............... 244/158

5,308,571  5/1994  Stiles et al. .............................. 264/257

FOREIGN PATENT DOCUMENTS 0245644  11/1987  European Pat. Off. .
2657675   1/1990  France .
2102106   1/1983  United Kingdom .

Primary Examiner—Christopher A. Fiorilla
Attorney, Agent, or Firm—Weingarten, Schurgin, Gagnebin & Hayes

[57] ABSTRACT

A thermal shielding element which includes a hollow rigid panel in the form of a shell made of a thermostructural composite including fiber reinforcement densified by a matrix, and a thermal insulant filling the panel is obtained by making a rigid block (20) of thermally insulating material of low density, the block having an outside surface whose shape corresponds to the shape of an inside surface of the panel, a fiber preform (11) constituting the reinforcement of the composite material is formed on the block of insulating material, and the fiber preform is densified with the material that constitutes the matrix of the composite material.

12 Claims, 3 Drawing Sheets

METHOD OF MANUFACTURING THERMAL SHIELDING ELEMENTS FOR SPACE PLANES

BACKGROUND OF THE INVENTION

The present invention relates to manufacturing thermal shielding elements intended most particularly for structures that are liable to be subjected to very high surface temperatures, typically greater than 1000° C., and possibly as high as 1800° C.

A non-exclusive field in which the invention can be applied is the manufacture of thermal shielding elements for space planes. On re-entering the atmosphere, space planes are subjected to major surface heating, and the surface temperature of certain potions thereof, e.g. the nose and the leading edges of the wings, may reach 1300° C. to 1400° C.

Known thermal shielding is generally of types: ablative shielding where thermal energy is absorbed by the substance constituting the shielding being progressively destroyed; and radiant shielding that dumps thermal energy by radiating it.

The drawbacks of ablative shielding include being unsuitable for reuse and giving rise to a change of shape while in use. That is why radiant shielding capable of withstanding high temperatures is used in applications such as space planes.

Thus, it is well known that the surface of a space plane to be shielded can be covered in tiles or blocks of insulating ceramics material. The tiles are stuck on with an interposed layer of material that forms an adaptor for accommodating relative deformation between the tiles and the cold structure to be shielded. That solution suffers from several drawbacks.

Tiles of ceramics material are sensitive to impact, and there is a high risk of chipping. Furthermore, they cannot always withstand the deformation of the cold structure that carries them, in spite of the presence of the material for accommodating such deformation. The technique of using an adhesive to secure the tiles is difficult to implement and not very reliable, and the operations of removing and replacing damaged tiles are lengthy and difficult. In addition, it is necessary to impart a shape to the cold supposing structure that reproduces the desired aerodynamic shape, which is itself defined by the tiles that are stuck to the cold structure and that perform the functions both of insulation and of fairing or streamlining.

To avoid those drawbacks, proposals are made in document FR-A-2 657 675 to use a thermal shielding element comprising a panel of thermal structural composite material in the form of a shell filled with thermally insulating material and suitable for being fixed to a cold supporting structure by means of mechanical fastening members. The panels are juxtaposed with interposed gaskets or jointing to form a substantially continuous outside surface, with access to the mechanical fixing members being possible from the outside by deforming the jointing.

With such a design, the functions of providing streamlining, insulation, and mechanical strength for the supporting structure are decoupled. The streamlining is defined by the panels without it being necessarily reproduced by the supporting structure, whereas insulation is provided, at least in part, by the insulating material inserted between the panels and the supporting structure.

In addition, the mechanical fixing members enable connections to be made by means of screws, thereby making it possible to do without adhesive and greatly facilitating the removal and replacement of a panel.

Finally, panels made of a thermostructural composite material, e.g. a ceramic matrix composite material, withstand impact better than do solid ceramics. In particular, the risk of chipping is practically non-existent.

Nevertheless, the manufacture of panels made of thermostructural composite material is lengthy, difficult, and expensive.

Thermostructural composite materials, i.e. composite materials whose mechanical properties make them suitable for constituting structural elements and which retain those properties up to high temperatures, are typically carbon-carbon (C—C) composite materials constituted by a reinforcing fabric or preform of carbon fibers densified by a carbon matrix, or else ceramic matrix composite (CMC) materials constituted by a reinforcing fabric or preform of refractory fibers (fibers of carbon or of ceramic) densified by a ceramic matrix.

To manufacture a panel of thermostructural composite material, a fiber preform is made initially, e.g. by draping plies of cloth, where the number of superposed plies is selected as a function of the thickness desired for the panel. The plies are draped over a tooling element whose shape reproduces the shape of the panel to be manufactured.

The panel is densified by liquid means (impregnation) or by gaseous means (chemical vapor infiltration). When using a liquid, the fiber preform is impregnated by a liquid precursor of the matrix material, with subsequent transformation of the precursor generally being obtained by heat treatment. When using a gas, the fiber preform is placed in an enclosure into which a gas is admitted that, under predetermined conditions of temperature and pressure, forms a deposit on the fibers inside the preform, either by decomposing or else by means of a reaction between the components of the gas. The above densification techniques making use of a liquid or of a gas for forming a matrix of carbon or of ceramic are well known.

During the densification process, it is often necessary to maintain the fiber preform in the desired shape, and that requires the use of tooling. When the shape of the product to be made is complex, as in the case of the shell-shaped panels mentioned above having portions for linking with fixing members, it is necessary to make use of special tooling. In addition, the tooling must be made of a material that is capable of withstanding the temperatures that are reached during the densification process, while also being inert relative to the materials constituting the preform, the matrix, and precursors therefor. Typically, for densification by means of chemical vapor infiltration, graphite tooling is used which is heavy, bulky, and very expensive.

In addition, after the panels have been made, it is necessary to install the thermal insulant with which they are filled. Unfortunately, the thermal insulant disclosed in the above-mentioned FR-A-2 657 675 is an insulant of the multiple screen type, made up of a stack of metal plated ceramic sheets. Such an insulant is fragile, very difficult to implement in receptacles of complex shapes, and it is sensitive to moisture.

SUMMARY OF THE INVENTION

An object of the invention is to provide a method enabling a thermal shielding element of the hollow rigid panel type to be manufactured using a thermostructural composite material filled with a thermal insulant, but while avoiding the drawbacks mentioned above. In particular, an object of the invention is to simplify the method of manufacturing such a thermal shielding element while using a thermally insulating material that is less fragile than materials using multiple reflecting screens.

According to the invention, this object is achieved by a method comprising the following steps:

making a rigid block of thermally insulating material of low density, the block having an outside surface whose shape corresponds to an inside surface of the panel; and making the panel of thermostructural composite material directly on the block.

Thus, the invention is remarkable in that the thermal insulant is constituted by a rigid block that can easily be molded or machined to the desired shape and that constitutes an element of tooling for use in making the panel of composite material. The method of manufacturing the thermal shielding element constituted by the panel and the insulant is thus greatly simplified.

The panel of composite material can be manufactured either by the technique of chemical vapor infiltration, or by the technique of liquid impregnation.

With chemical vapor infiltration, a fiber preform constituting the reinforcement of composite material is formed on the block of thermal insulant, e.g. by draping two-dimensional fiber plies, and the preform is densified with the matrix-constituting material. Densification is performed while keeping the preform in the desired shape that corresponds to the shape of the panel to be manufactured. To this end, the preform is held between the block of thermal insulant and a complementary element of tooling. In a variant, the preform may be held in place by being fixed to the block of thermal insulant, e.g. by means of a shaping ply bonded to the block.

When using the liquid technique, two-dimensional fiber plies preimpregnated with a precursor for the composite material matrix are draped over the block of thermal insulant, and the precursor is transformed to obtain the matrix-constituting material, with transformation generally being obtained by applying heat treatment.

The block of thermal insulant is made out of a low density material, preferably out of a material whose density is less than 50 kg/m3. It is possible to use a block of porous ceramic, e.g. a block of alumino-silicate type porous ceramic, optionally reinforced by short fibers made of ceramic (silica or alumina). Because of the porosity of the block of insulant, it is preferable to protect its outside surface so as to avoid densifying the block with the matrix-constituting material of the composite material of the panel. This protection can be obtained by forming a sealing layer on the outside surface of the block, e.g. a layer of ceramic cement, or else by interposing a non-porous sheet.

The invention will be better understood on reading the following description given by way of non-limiting example and made with reference to the accompanying drawings, in which:

BRIEF DESCRIPTION OF THE DRAWINGS

FIGS. 1 and 2 are diagrams showing a thermal shielding system as described in document FR-A-2 657 675, in particular, and designed for shielding the structure of a space plane.

DESCRIPTION OF THE PREFERRED EMBODIMENTS

Figure 1:
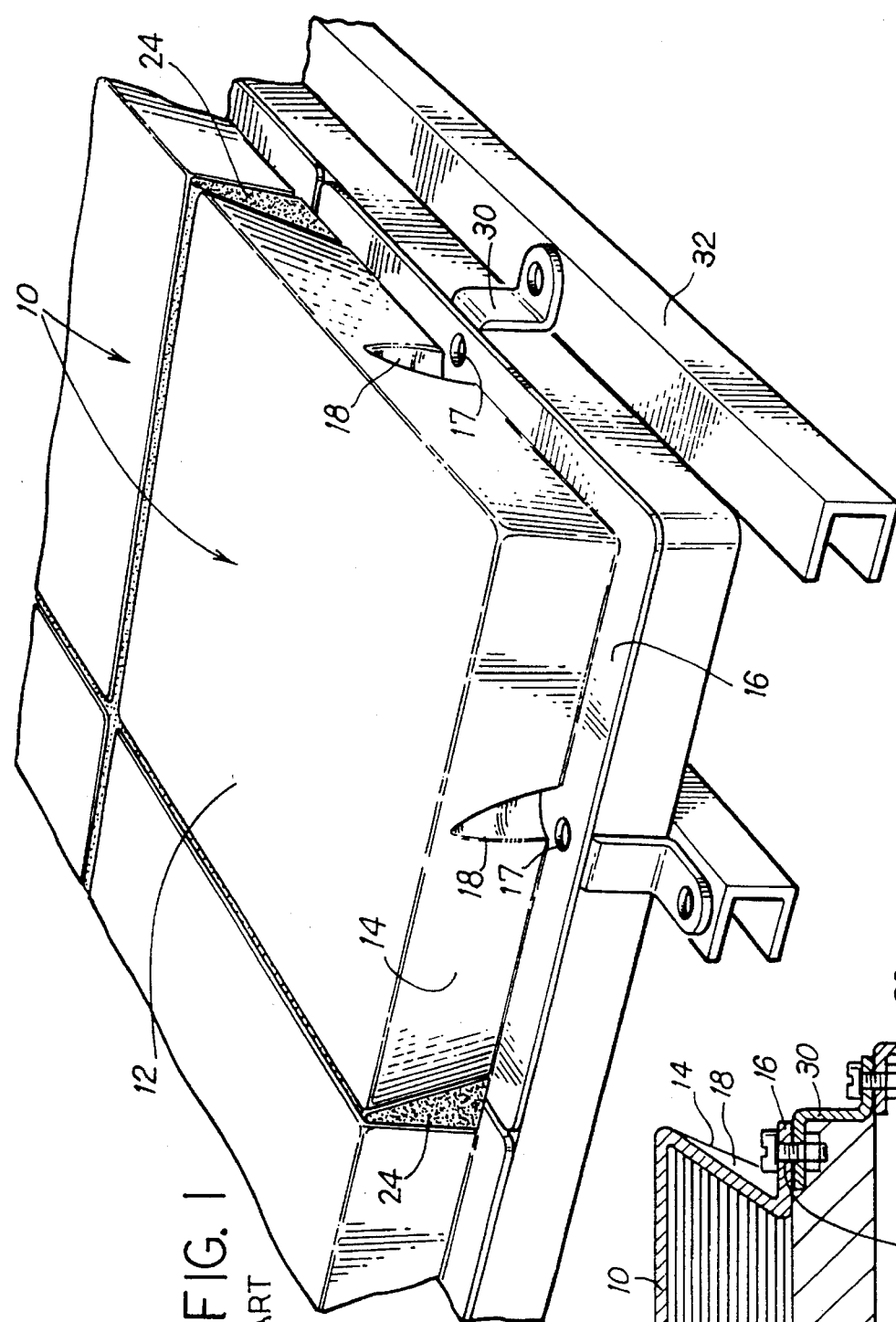
FIG. 1 is a diagrammatic perspective view of a known shielding system for a space plane.

The thermal shielding is constituted by juxtaposed elements comprising a hollow shell-shaped rigid panel 10 filled with a thermal insulant 20. The panel 10 is substantially in the form of a rectangular parallelepiped having an outside face 12 and flanks 14 terminated by rims 16. It is fixed to the structure that is to be shielded by means of supports 30 against which the rims 16 are pressed. The connections between the rims 16 and the supports 30, and the connections between the supports 30 and length members 32 of the structure to be shielded are provided in conventional manner by screw means. To this end, holes 17 are formed in the rims 16, in the middles thereof. The flanks 14 have hollow portions or cavities 18 overlying the holes 17 so as to facilitate access to the screws received in said holes. An additional layer of thermal insulation 22 is interposed between the panels filled with insulant 20 and the structure to be shielded.

Figure 2:
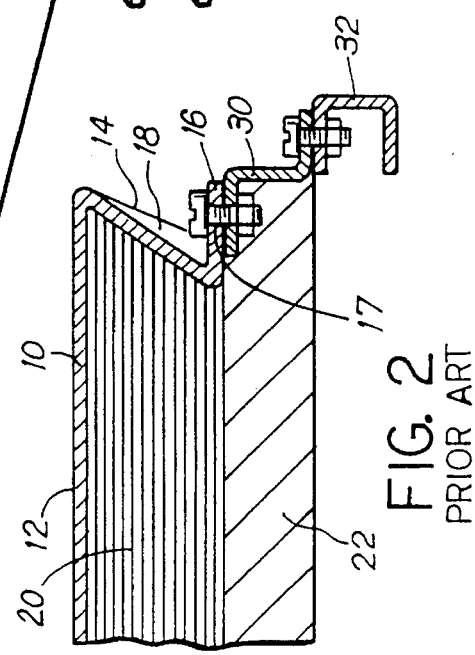
FIG. 2 is a section view showing how the elements of the thermal shielding system of FIG. 1 are fixed.

The outside faces 12 of the juxtaposed panels 10 define the streamlining of the space plane. As shown in FIG. 2, the flanks 14 of the panels 10 are slightly inclined relative to the normal of the faces 12 so as to define between adjacent panels gaps of increasing section going away from the outside faces 12 towards the structure to be shielded. These gaps are filled with jointing 24 which, on being deformed, allow a tool to pass and gain access to the screws for making connections between the rims 16 and the supports 30.

The method of the invention for manufacturing a thermal shielding element constituted by a panel 10 of thermostructural composite material and a thermal insulant 20 filling the panel 10 is now described with reference to FIGS. 3A to 3D.

In this method, a rigid block 20 of insulant is made initially, and the panel 10 of composite material is manufactured directly on the block 20 which constitutes a tooling element for making the panel.

Figure 3A:
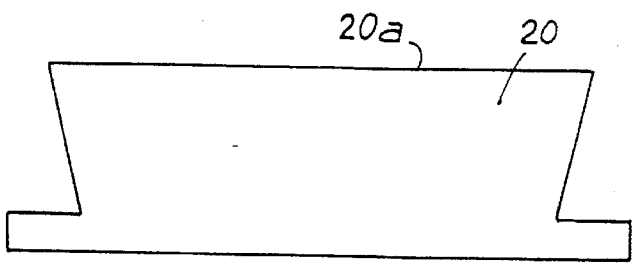
FIGS. 3A to 3D show successive steps in the manufacture of a thermal shielding element as shown in FIGS. 1 and 2 and in application of a first implementation of the method of the invention.

The block 20 is obtained by machining or by molding so as to present an outside surface whose shape matches that of the panel, having flanks and rims matching those of the panel (see FIG. 3A). Compared with FIG. 1, the block replaces the insulant housed inside the panel, and at least a portion of the insulating layer 22 situated beneath the panel. The block 20 is preferably made of a porous ceramic, e.g. of the alumino-silicate type. The manufacture of such low density porous ceramics is well known. The block 20 is preferably constituted by a porous ceramic of density less than 50 kg/m3.

The block 20 may be obtained by cutting out and machining from a prefabricated block of larger dimensions. In a variant, the block 20 is molded, e.g. by molding and vacuum sintering a composition such as a gel that is a precursor of the ceramic. Short reinforcing fibers may be inserted in the porous ceramic, at the precursor stage, e.g. fibers of silica or of alumina.

The surface pores of the block are preferably closed to avoid the block itself being densified by the matrix of panel-forming material during manufacture of the panel directly on the block. This may be done by forming a sealing layer 20a of ceramic cement on the block 20 by spraying or by coating. In a variant, the block may be sealed by covering it with a non-porous ply, e.g. a stuck-on sheet of ceramic.

Figure 3B:
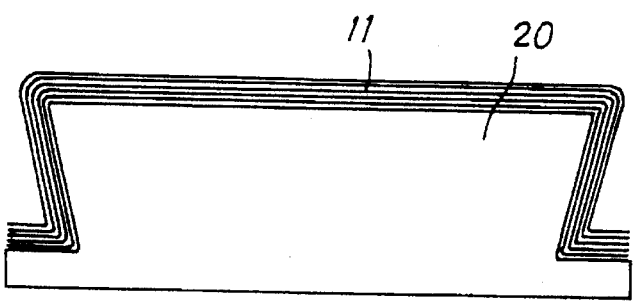

The following step consists in forming a fiber preform on the block 20 for the purpose of constituting the fiber reinforcement of the composite material of the panel 10. The preform is made of refractory fibers such as carbon fibers or ceramic fibers (e.g. fibers of silicon carbide). The preform is made up by draping two-dimensional fiber plies 11, e.g. layers of superposed cloth (FIG. 3B). Additional plies of smaller size may be added in certain portions of the preform in order to locally increase the thickness of the panel in such portions, in particular the portions that constitute the fixing zones of the panel.

Figure 3C:
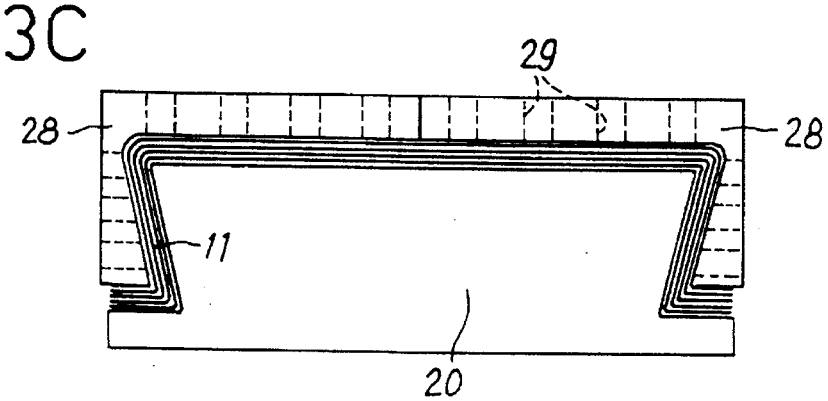

After draping, the panel is kept in the desired shape by being secured to the block of insulant 20, and optionally by being compressed between the block and a complementary tooling element 38, e.g. made of graphite and comprising a plurality of portions (FIG. 3C).

The preform is densified by the matrix-constituting material of the composite material of the panel by chemical vapor infiltration. The matrix is made of refractory material, e.g. carbon or preferably ceramic. The techniques of chemical vapor infiltration of carbon and of ceramic, in particular of silicon carbide, are well known. The preform held between the block 20 and the element of tooling 28 is placed in an enclosure. A gas is emitted into the enclosure and it infiltrates into the preform so as to form a deposit of matrix material on the fibers. This deposit is produced under predetermined conditions of pressure and temperature by the gas decomposing or by components of the gas reacting together. It may be observed that the tooling element 28 is pierced by holes 29 for facilitating access to the preform by the gas.

Figure 3D:
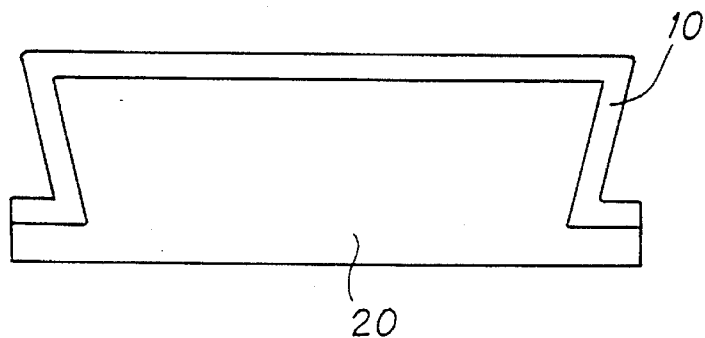

After densification, final machining is performed to rectify the faces of the panel 10 and to prepare the fixing zones. A thermal shielding element ready for installation is thus obtained (FIG. 3D).

The method described above can be used to make thermal shielding elements in which the panels, e.g. made of C—SiC composite (carbon fiber reinforcement and silicon carbide matrix) have respective outside faces that are rectangular or square in shape and of size that may be several hundreds of millimeters long, e.g. about 300 mm long, with a thickness that may be of the order of one millimeter, or even less than 1 mm, and with flanks of a height of several tens of mm, e.g. 50 mm to 120 mm, depending on the degree of insulation that is desired.

Figure 4:
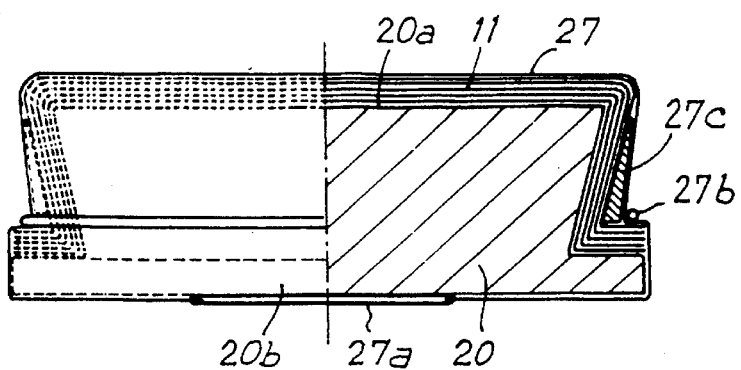
FIG. 4 shows a variant of the method step shown in FIGS. 3A to 3D.

In a variant of the method, the preform is kept in the desired shape for densification purposes by means of a shaping ply 27 (FIG. 4). The ply 27 may be a layer of cloth which is tensioned over the preform and which is fixed to the rigid block 20. The cloth 27 is held in place by means of a binding thread 27a over the bottom face 20b of the block 20 while a ligature 27b extends around the bottoms of the flanks of the block 20 so as to hold the preform pressed against the flanks. Wedge-shaped pieces 27c press the plies into the recessed portions of the block corresponding to the cavities 18 in the flanks. The shaping ply 27 is made of a material whose thermal expansion coefficient is different from that of the material constituting the preform. As a result, because densification by chemical vapor infiltration takes place at a relatively high temperature, the difference in expansion between the shaping ply 27 and the fiber preform gives rise, on the cooling that follows infiltration, to splitting in the interface zone between the preform and the shaping ply. The ply 27 can thus easily be separated form the densified panel. The use of a shaping ply which avoids any need to use expensive and bulky graphite tooling is described in document FR-A-2 659 949.

In the description above, the composite panel 10 is made by means of chemical vapor infiltration. Nevertheless, the method of the invention can also be implemented using the well-known technique if impregnation.

Figure 5A:
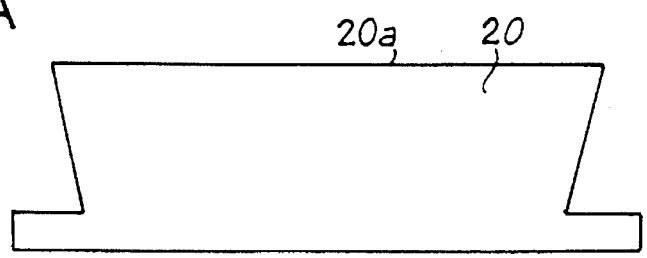
FIGS. 5A to 5C show successive steps in the manufacture of a thermal shielding element in application of a second implementation of the invention.
Figure 5B:
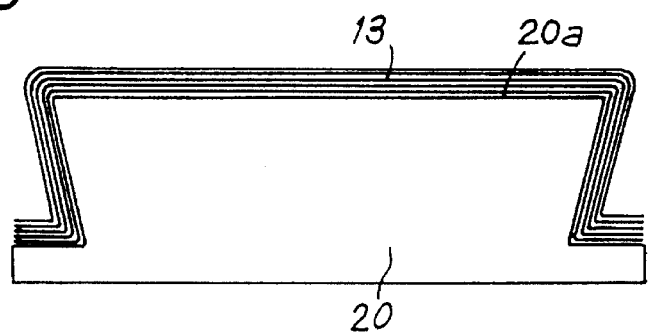

Starting with a block 20 (FIG. 5A) similar to that shown in FIG. 3A, the panel is formed by draping plies 13 on the block, which plies are preimpregnated with a liquid precursor of the matrix of the composite material (FIG. 5B). For a carbon matrix, the precursor is a pitch or a resin having a high coke content, optionally in solution in a solvent. For a ceramic matrix, the precursor may be a liquid intermetallic compound, such as a polycarbosilane which is a precursor of silicon carbide. The precursor is transformed into the matrix material by thermal decomposition. This may be achieved without it being necessary to secure the plies 13 by means of additional tooling or a shaping ply. The sealing layer 20a may be restricted to the portions of the outside surface of the block 20 that are in contact with the plies 13.

Figure 5C:
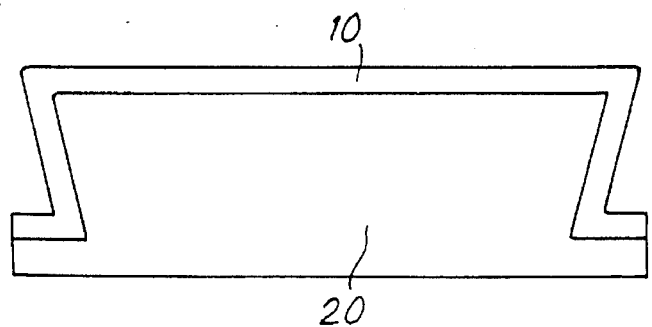

After thermal decomposition, the panel is subjected to final machining, and a thermal shielding element is obtained (FIG. 5C) identical to that of FIG. 3D.

As mentioned above, the number of draped plies may be greater in some portions of the panel in order to impart greater thickness and greater mechanical strength to those portions.

We claim:

1. A method of manufacturing a thermal shielding element comprising an outer rigid panel made of a thermostructural composite material comprising a fiber reinforcement densified by a refractory matrix material, said panel having an external wall forming an outer wall of the thermal shielding element, and side walls defining with said external wall a recess filled with a thermal insulant, said method comprising the steps of:

providing a rigid block of thermally insulating material of low density, the block having an outside surface portion whose shape corresponds to an inside surface of the recess formed by the panel, forming a fiber preform by laying a fibrous material on said outside surface portion of the block of insulating material, and densifying the fiber preform with the refractory matrix material of said thermostructural composite material, using the block of insulating material as a tooling element but without substantially densifying said block of insulating material, whereby a panel of thermostructural composite material is formed directly on the block of insulating material constituting said thermal insulant of the thermal shielding element.

2. The method of claim 1, wherein said fiber preform is densified while being maintained in a shape corresponding to the shape of said outer rigid panel.

3. The method of claim 2, wherein the fiber preform is held between the block of thermal insulating material and a complementary tooling element.

4. The method of claim 2, wherein said fiber preform is held by being pressed between a shaping ply and the block of thermal insulating material.

5. The method of claim 1, wherein the fiber preform is formed by draping two-dimensional fiber plies over an outside surface portion of the block of insulating material.

6. The method of claim 5, wherein the number of plies draped varies so as to obtain a panel having a non-uniform thickness.

7. The method of claim 5, wherein the outside surface portion of the block is protected by depositing a sealing layer thereon.

8. The method of claim 1, wherein the block of insulating material is porous and the outside surface portion of said block is protected to avoid the block being densified by said refractory matrix material of said thermostructural composite material.

9. The method of claim 8, wherein the outside surface portion of the block is protected by laying a non-porous interposition ply on the block.

10. The method of claim 1, wherein the block of insulating material is made of porous ceramic.

11. The method of claim 1, wherein the block of insulating material is made by molding a composition that constitutes a precursor for a ceramic, and by transforming the precursor into ceramic.

12. The method of claim 1, wherein the block of insulating material is made of a fiber reinforced porous ceramic.

* * * * *